United States Patent
Tanaka et al.

(10) Patent No.: US 6,835,455 B2
(45) Date of Patent: Dec. 28, 2004

(54) ULTRAFINE PARTICULATE COMPLEX OXIDE CONTAINING TITANIUM OXIDE

(75) Inventors: Jun Tanaka, Toyama (JP); Shinichiro Tomikawa, Nagano (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/382,646

(22) Filed: Mar. 7, 2003

(65) Prior Publication Data

US 2003/0152772 A1 Aug. 14, 2003

Related U.S. Application Data

(62) Division of application No. 09/841,095, filed on Apr. 25, 2001, now Pat. No. 6,548,169.
(60) Provisional application No. 60/270,875, filed on Feb. 26, 2001.

(30) Foreign Application Priority Data

Apr. 25, 2000 (JP) ..................... P2000-124816
Feb. 19, 2001 (JP) ..................... P2001-041462

(51) Int. Cl.$^7$ .............. C09C 1/36; B32B 5/16
(52) U.S. Cl. .............. 428/403; 106/436; 106/437; 428/328; 428/329
(58) Field of Search .............. 428/328, 329, 428/402, 403; 423/115, 326, 327.1, 593, 598, 600; 106/436, 437

(56) References Cited

U.S. PATENT DOCUMENTS

| | | | | |
|---|---|---|---|---|
| 3,208,866 A | * | 9/1965 | Lewis et al. | 106/437 |
| 3,615,202 A | * | 10/1971 | Stem et al. | 423/613 |
| 3,650,694 A | * | 3/1972 | Allen | 423/613 |
| 4,176,089 A | * | 11/1979 | Cull | 502/236 |
| 4,746,638 A | * | 5/1988 | Hori et al. | 501/127 |
| 4,846,891 A | * | 7/1989 | Braun | 106/436 |
| 5,201,949 A | | 4/1993 | Allen et al. | |
| 5,332,433 A | * | 7/1994 | Story et al. | 106/442 |
| 5,922,120 A | * | 7/1999 | Subramanian et al. | 106/437 |
| 6,344,272 B1 | * | 2/2002 | Oldenburg et al. | 428/403 |
| 6,391,276 B1 | * | 5/2002 | Suda et al. | 423/598 |
| 6,548,169 B2 | * | 4/2003 | Tanaka et al. | 428/402 |
| 6,572,964 B2 | * | 6/2003 | Tanaka et al. | 428/328 |
| 6,632,528 B1 | * | 10/2003 | Clough | 428/402 |

FOREIGN PATENT DOCUMENTS

| | | | |
|---|---|---|---|
| JP | 63-206314 | * | 8/1988 |
| JP | 01-153529 | * | 6/1989 |
| JP | 05-294627 | * | 11/1993 |
| JP | 07-291629 | * | 11/1995 |
| JP | 9-315818 A | | 12/1997 |
| JP | 10-251021 A | | 9/1998 |
| JP | 11-197513 A | | 7/1999 |
| JP | 2000-34122 | * | 2/2000 |

* cited by examiner

*Primary Examiner*—H. Thi Le
(74) *Attorney, Agent, or Firm*—Sughrue Mion, PLLC

(57) ABSTRACT

The present invention provides a process for producing ultrafine particulate complex oxide containing titanium oxide, including vapor-phase producing a complex oxide containing titanium oxide having a BET specific surface area of about 5 to about 200 m$^2$/g, where a starting material gas containing titanium tetrachloride and an oxidizing gas are preheated to about 700° C. or more, and are reacted with a solution or a slurry of a salt containing a metallic element. The present invention also provides an ultrafine particulate complex oxide containing titanium oxide obtained by the process, and use of the oxide.

14 Claims, 1 Drawing Sheet

ULTRAFINE PARTICULATE COMPLEX OXIDE CONTAINING TITANIUM OXIDE

CROSS REFERENCE TO RELATED APPLICATIONS

This is a divisional of Application No. 09/841,095 filed Apr. 25, 2001, now U.S. Pat. No. 6,548,169 which claims benefit of Provisional Application No. 60/270,875 filed Feb. 26, 2001; the above noted prior applications are all hereby incorporated by reference.

This application claims priority from Japanese Patent Application No. P2001-041462, filed Feb. 19, 2001, which claims priority from Japanese Patent Application No. P2000-124816, filed Apr. 25, 2000.

FIELD OF THE INVENTION

The present invention relates to a complex oxide containing titanium oxide obtained by a vapor phase method, a process for producing the complex oxide, and a composition containing the complex oxide. More specifically, the present invention relates to a complex oxide containing titanium oxide produced from titanium tetrachloride and a solution or slurry of a salt containing a metallic element. The present invention also relates to a process for producing the complex metal oxide and a composition containing the complex oxide.

BACKGROUND OF THE INVENTION

The industrial field where ultrafine particulate titanium oxide (sometimes also called as "titanium dioxide") is applied has recently expanded. For example, studies are being made on uses over a wide range of fields, such as starting material for high-performance dielectric, ultraviolet-shielding material, additive to silicone rubber and photocatalytic material.

Use of ultrafine particulate titanium oxide as a starting material for a Perovskite-type dielectric is described below.

As shown in the following reaction formula, a titanium oxide is subjected to a solid phase reaction at a temperature of about 1,200° C. to produce a barium titanate dielectric material:

Reaction Formula:

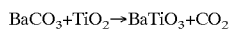

$BaCO_3 + TiO_2 \rightarrow BaTiO_3 + CO_2$

In this case, barium carbonate decomposes at about 700° C. to produce BaO having high ionicity and this BaO diffuses into a $TiO_2$ particle having a covalent bonding property to produce barium titanate. The particle size of barium titanate is determined by the crystal size of $TiO_2$ at the time of reaction and therefore, the crystallinity, the particle size and the like of titanium oxide as a starting material are important.

Also, to cope with the requirement for higher dielectric constant or smaller size of a ceramic capacitor, there is a demand for ultrafine particulate barium titanate and heretofore, investigations have been made for forming ultrafine particles of titanium oxide as a starting material. The ultrafine particle has not been clearly defined so far but, in general, indicates a fine particle having a primary particle size of about 0.1 μm or less.

However, titanium oxide particles having a particle size of 0.1 μm or less undertake vigorous growth in the vicinity of the above-described reaction temperature of 700° C., and disadvantageously fail in contributing to the formation of ultrafine particulate barium titanate. Accordingly, titanium oxide suitable for this purpose is being demanded.

In view of the photocatalytic activity, uses for antifouling, sterilization or deodorization purpose, or the ultraviolet-shielding effect, uses of titanium oxide for cosmetic materials are attracting attention. These uses are supported by excellent safety, processability, functionality and durability of titanium oxide.

Photocatalysis is described below.

Titanium oxide has a property of absorbing an ultraviolet ray at a wavelength of about 400 nm or less and exciting an electron. An electron and a hole generated and reaching the particle surface combine with oxygen or water to generate various radicals. The radical seeds mainly show an oxidation activity and decompose by oxidation a substance adhering to the surface. This is a basic principle of photocatalysis.

In order to enhance the catalytic activity, for example, the following methods are used.

(1) Reducing particle size

This is very effective for inhibiting recombination of an electron and a hole generated.

(2) Enhancing crystallinity

This is effective for increasing the diffusion rate of an electron and a hole generated to the surface.

(3) Performing charge separation

An electron and a hole generated are subjected to charge separation and the yield thereof reaching the surface is increased.

(4) Controlling band gap

The band gap is reduced (maximum absorption wavelength is increased) by adding trace impurities, whereby use of light, for example, sunlight can be elevated.

Among the above, various additives are being studied for the purpose of (3) and (4) in recent years.

In order to coat fine particulate titanium oxide having the above-described photocatalytic effect on a support, a method of coating a slurry obtained by mixing it with a binder on a support and then baking the coating at 600° C. or more may be used. However, at this time, primary particles grow due to sintering, and as a result, the catalytic activity disadvantageously decreases.

Conventionally, in the production process of fine particulate composite oxide containing titanium oxide, a surface treatment by a liquid phase method is a representative process. However, this process has a problem in that a step of removing a solvent, namely, filtration and drying is necessary. In addition, in the case where the solvent is water, the water works out to a binder and accelerates the coagulation, and therefore, a step of strongly cracking or pulverizing the agglomerate is required. Furthermore, when an organic solvent is employed, a system for recovering the solvent is necessary and a cumbersome production process results.

JP-A-11-228139 (the term "JP-A" as used herein means an "unexamined published Japanese patent application") discloses a technique for obtaining a composite powder material by atomizing and combusting an emulsion starting from an organic solvent/dispersant and an aqueous solution having dissolved therein a salt containing titanium oxide of BET 15 m²/g or more and a metallic element. This method is, however, disadvantageous in that the process takes a long time, and a large amount of a flammable solvent is necessary for the combustion.

SUMMARY OF THE INVENTION

In view of the above-described uses of fine particulate metal oxide, an object of the present invention is to provide a simple and easy process for producing ultrafine particulate complex oxide (sometimes also called "compound oxide") containing titanium oxide. Another object of the present invention includes providing the complex oxide and a composition containing the complex oxide.

As a result of extensive investigations, the present inventors have found that the above-described problems can be solved by producing an ultrafine particulate complex oxide having a BET specific surface area of about 5 to about 200 $m^2/g$ in a one-stage reaction, and more specifically, in a vapor phase process for producing a complex oxide containing titanium oxide, by reacting a starting material gas containing titanium tetrachloride, an oxidizing gas, each gas being pre-heated at about 700° C. or more, and a solution or slurry of a salt containing a metallic element. The term "metallic element" as used in the present invention includes the elements defined in Table 1.

That is, the present invention comprises the following embodiments.

(1) A process for producing ultrafine particulate complex oxide containing titanium oxide, comprising vapor-phase producing a complex oxide containing titanium oxide having a BET specific surface area of about 5 to about 200 $m^2/g$, wherein a starting material gas containing titanium tetrachloride and an oxidizing gas, each gas being preheated to about 700° C. or more, are reacted with a solution or a slurry of a salt containing a metallic element.

(2) The process for producing a complex oxide containing titanium oxide as described in 1 above, wherein the complex oxide contains a bond of —Ti—O-metallic element-.

(3) The process for producing a complex oxide containing titanium oxide as described in 1 above, wherein the salt containing a metallic element is at least one salt selected from the group consisting of a hydroxide, a halide, a nitrate, a sulfate, a carbonate and an organic acid salt each containing a transition metal element.

(4) The process for producing a complex oxide containing titanium oxide as described in 1 above, wherein the salt containing a metallic element is at least one salt selected from the group consisting of a hydroxide, a halide, a nitrate, a sulfate, a carbonate and an organic acid salt each containing an alkaline earth metal.

(5) The process for producing a complex oxide containing titanium oxide as described in 1, wherein the salt containing a metallic element is at least one salt selected from the group consisting of a hydroxide, a halide, a nitrate, a sulfate, a carbonate and an organic acid salt each containing an alkali metal.

(6) The process for producing a complex oxide containing titanium oxide as described in 1 above, wherein the salt containing a metallic element is at least one salt selected from the group consisting of a hydroxide, a halide, a nitrate, a sulfate, a carbonate and an organic acid salt each containing a metal of Group IIIb or IVb.

(7) The process for producing a complex oxide containing titanium oxide as described in 1 above, wherein the solvent of the solution or slurry has a boiling point of about 40° C. or more at an atmospheric pressure.

(8) The process for producing a complex oxide containing titanium oxide as described in 1 above, wherein the solution or slurry is fed from a portion upstream from than the point of initiating the reaction of the starting material gas containing titanium tetrachloride with the oxidizing gas.

(9) The process for producing a complex oxide containing titanium oxide as described in 1 above, wherein the solution or slurry is fed between the point of initiating the reaction of the starting material gas containing titanium tetrachloride with the oxidizing gas and the portion about 200 mm downstream from that.

(10) The process for producing a complex oxide containing titanium oxide as described in 1 above, wherein the solution or slurry is fed in the atomized state.

(11) The process for producing a complex oxide containing titanium oxide as described in 1 above, wherein the reaction is performed by feeding the starting material gas containing titanium tetrachloride and the oxidizing gas, each gas being preheated at about 700° C. or more, to a reaction tube each at a flow rate of about 10 m/sec or more.

(12) The process for producing a complex oxide containing titanium oxide as described in 1 above, wherein the reaction is performed by allowing the starting material gas containing titanium tetrachloride and the oxidizing gas to stay in the reaction tube under a high-temperature condition such that the temperature within the reaction tube exceeds about 600° C., for a time period of about 1 second or less.

(13) The process for producing a complex oxide containing titanium oxide as described in 1 above, wherein the average flow rate of the starting material gas within the reaction tube is about 5 m/sec or more.

(14) The process for producing a complex oxide containing titanium oxide as described in 1 above, wherein a turbulence is generated upon feeding of the starting material gas containing titanium tetrachloride and the oxidizing gas, each gas being preheated, into the reaction tube.

(15) The process for producing a complex oxide containing titanium oxide as described in 1 above, wherein the starting material gas containing titanium tetrachloride and the oxidizing gas are fed into the reaction tube through a coaxial parallel-flow nozzle and the inner tube of the coaxial parallel-flow nozzle has an inside diameter of about 50 mm or less.

(16) The process for producing a complex oxide containing titanium oxide as described in 1 above, wherein the starting material gas containing titanium tetrachloride contains from about 10 to 100 vol % of titanium tetrachloride.

(17) The process for producing a complex oxide containing titanium oxide as described in 1 above, wherein the starting material gas containing titanium tetrachloride and the oxidizing gas each is preheated at about 1,000° C. or more.

(18) An ultrafine particulate complex oxide containing titanium oxide, which is produced by the production process described in any one of 1 to 17 above.

(19) An ultrafine particulate complex oxide containing titanium oxide, which is an ultrafine particulate complex oxide having a BET specific surface area of about 5 to about 200 $m^2/g$.

(20) An ultrafine particulate complex oxide containing titanium oxide as described in 19 above, which is in the mixed crystal state of allowing a bond of —Ti—O-metallic element- to be present within a primary particle.

(21) An ultrafine particulate complex oxide containing titanium oxide as described in 19 above, wherein the average primary particle size is from about 0.008 to about 0.3 μm.

(22) An ultrafine particulate complex oxide containing titanium oxide as described in 19, wherein the decrease percentage of the BET specific surface area after heating at 700° C. for 1 hour is about 20% or less.

(23) A composition comprising at least one ultrafine particulate complex oxide containing titanium oxide selected from the ultrafine particulate complex oxides containing titanium oxide described in any one of 18 to 22 above.

In the present invention, the starting material gas containing titanium tetrachloride and the oxidizing gas each is suitably fed into a reaction tube at a flow rate of about 10 m/sec or more, preferably about 30 m/sec or more. These gases are preferably reacted to allow the gases to reside and react within the reaction tube under a high-temperature condition in excess of about 600° C. for about 1 second or less (hereinafter sometimes referred to as a "high-temperature residence time").

In particular, as a result of extensive investigations on the growing mechanism of particles in a gas phase method, the present inventors have found that ultrafine particulate oxide

TABLE 1

Elements Defined as Metallic Element

| Ia | IIa | IIIa | IVa | Va | VIa | VIIa | VIII | | | Ib | IIb | IIIb | IVb | Vb | VIb | VIIb | O |
|---|---|---|---|---|---|---|---|---|---|---|---|---|---|---|---|---|---|
| 1 | | | | | | | | | | | | | | | | | |
| 2 | 3 Li | 4 Be | | | | | | | | | | | 5 B | | | | |
| 3 | 11 Na | 12 Mg | | | | | | | | | | | 13 Al | 14 Si | 15 P | | |
| 4 | 19 K | 20 Ca | 21 Sc | 23 V | 24 Cr | 25 Mn | 26 Fe | 27 Co | 28 Ni | 29 Cu | | 30 Zn | 31 Ga | 32 Ge | 33 As | 34 Se | |
| 5 | 37 Rb | 38 Sr | 39 Y | 40 Zr | 41 Nb | 42 Mo | 43 Tc | 44 Ru | 45 Rh | 46 Pd | 47 Ag | 48 Cd | 49 In | 50 Sn | 51 Sb | 52 Te | |
| 6 | 55 Cs | 56 Ba | (LAN) | 72 Hf | 73 Ta | 74 W | 75 Re | 76 Os | 77 Ir | 78 Pt | 79 Au | 80 Hg | 81 Tl | 82 Pb | 83 Bi | 84 Po | 85 At |
| 7 | 87 Fr | 88 Ra | (ACT) | | | | | | | | | | | | | | |
| Lanthanide (rare earth) | | 57 La | 58 Ce | 59 Pr | 60 Nd | 61 Pm | 62 Sm | 63 Eu | 64 Gd | 65 Tb | 66 Dy | 67 Ho | 68 Er | 69 Tm | 70 Yb | 71 Lu | |
| Actinoid | | 89 Ac | 90 Th | 91 Pa | 92 U | 93 Np | 94 Pu | 95 Am | 96 Cm | 97 Bk | 98 Cf | 99 Es | 100 Fm | 101 Md | 102 No | 103 Lr | |

DESCRIPTION OF THE PRESENT INVENTION

Figure 1:
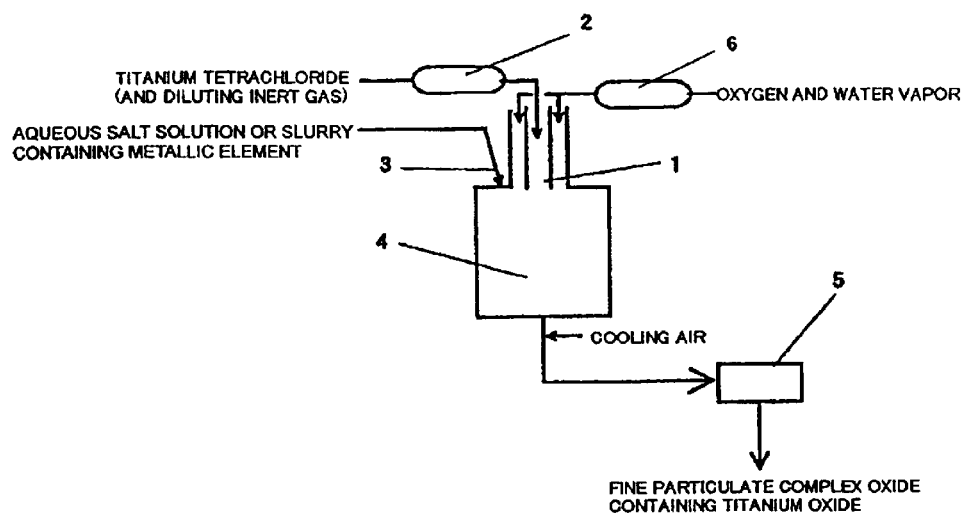
FIG. 1 is a schematic diagram of one example of a reaction tube with a coaxial parallel flow nozzle, which is preferably used in the present invention.

The present invention is described in detail below.

The present invention relates to a production process of a complex oxide containing titanium oxide. In a vapor phase method of oxidizing mainly titanium tetrachloride with an oxidizing gas at a high temperature to produce an ultrafine particulate complex oxide containing titanium oxide, a starting material gas containing titanium tetrachloride, an oxidizing gas, each gas being preheated at about 700° C. or more, and a solution or slurry of a salt containing a metallic element are reacted, thereby producing an ultrafine particulate complex oxide containing titanium oxide having a BET specific surface area of about 5 to about 200 m²/g in a one-stage reaction.

In the process for producing an ultrafine particulate complex oxide containing titanium oxide, the oxidizing gas is oxygen, water vapor or a mixed gas thereof.

In the present invention, the starting material gas containing titanium tetrachloride and the oxidizing gas each must be preheated at a temperature of at least about 700° C. or more, preferably about 900° C. or more, before the reaction. If the preheating temperature of the starting material gas containing titanium tetrachloride and the oxidizing gas is less than about 700° C., the reactivity with a solution or slurry of a salt containing a metallic element is reduced. As a result, ultrafine particles are difficult to form, and at the same time, the residual chlorine after dechlorination increases.

can be preferably obtained by controlling, as factors acting on the growth of particles, CVD (chemical vapor deposition) mechanism and the combining/sintering growth mechanism due to the collision of particles (by reducing the growing time in either growth). More specifically, in growth by CVD, the preheating temperature is elevated to enhance the chemical reactivity (reaction rate), thereby suppressing the growth of oxide. In the growth by combining/sintering, after the completion of CVD, the system is swiftly subjected to cooling, dilution or the like to reduce the high-temperature residence time as much as possible, whereby the growth due to combining/sintering or the like can be suppressed. By selecting production conditions as above, an ultrafine particulate complex oxide containing titanium oxide, having a BET specific surface area of about 5 to about 200 m²/g, preferably from about 10 to about 100 m²/g, can be obtained.

The flow rate at the time of introducing the starting material gas containing titanium tetrachloride and the oxidizing gas into a reaction tube is preferably about 10 m/sec or more, because by increasing the flow rate, the mixing of two gases is accelerated. When the temperature at the introduction of gases into a reaction tube is about 700° C. or more, the reaction is completed simultaneously with the mixing, and therefore, the generation of uniform nuclei is increased and at the same time, the zone of causing formation of particles grown under CVD control can be shortened.

In the present invention, the starting material is preferably introduced into a reaction tube so that the gases introduced into the reaction tube can be thoroughly mixed. As long as the gases are thoroughly mixed, the fluid state of gases within the reaction tube is not particularly limited. However, for example, a fluid state of causing turbulence is preferred. A vortex flow may also be present.

In the present invention, the gases fed into the reaction tube preferably flow at a higher rate to perform a complete mixing of the gases. Particularly, the average flow rate is preferably about 5 m/sec or more. When the gases flow at a flow rate of about 5 m/sec or more within the reaction tube, the gases can be satisfactorily mixed within the reaction tube.

The inlet nozzle for introducing the starting material gas into the reaction tube may be a nozzle giving coaxial parallel flow, oblique flow, cross flow or the like, but the present invention is not limited thereto. In general, the coaxial parallel-flow nozzle is inferior in mixing degree to the nozzle giving oblique flow or cross flow, but is preferably used in view of the design because of its simple structure. For example, in the case of a coaxial parallel-flow nozzle, the starting material gas containing titanium tetrachloride is introduced into the inner tube and the oxidizing gas is introduced into the outer tube. In view of the mixing of gases, the inner diameter is preferably about 50 mm or less, more preferably from about 10 to about 50 mm.

The salt containing a metallic element may be at least one freely selected from a hydroxide, a halide, a nitrate, a sulfate, a carbonate and an organic acid salt each containing a transition metallic element, an alkaline earth metal, an alkali metal or a metal of Group IIIb or IVb.

The salt containing a metallic element may be fed into a reactor in a solution or slurry state, but is preferably fed in the solution state.

The solvent is preferably a solvent having a boiling point of about 40° C. or more at an atmospheric pressure. Specific examples thereof include water, methanol, ethanol, propanol, 2-propanol, 1-butanol, 2-butanol, acetone, methyl ethyl ketone, dibutyl ether, N,N-dimethylformamide, dimethyl sulfoxide, formic acid, acetic acid, ethyl acetate, benzene, toluene, hexane and octane. Among these, in view of polarity and handleability, water is preferred. If the boiling point is too low, the solvent may be evaporated within the feeding nozzle and this is not preferred.

The solution or slurry may be fed from an upstream portion from the point of initiating the reaction of the starting material gas containing titanium tetrachloride with the oxidizing gas or may be fed between the point of initiating the reaction of the starting material gas containing titanium tetrachloride with the oxidizing gas and the portion about 200 mm downstream from that. If the feeding point is more downstream, the additive distribution in the produced oxide disadvantageously becomes non-uniform.

The solution or slurry may also be fed by dropwise addition or atomization to the reaction mixture of the starting material gas containing titanium tetrachloride and the oxidizing gas. In view of uniform mixing, the solution or slurry is preferably fed in the atomized state.

The reaction within the reaction tube is an exothermic reaction. If the reaction temperature is higher than the sintering temperature of the produced ultrafine particulate complex oxide containing titanium oxide, sintering thereof proceeds to give grown particles, unless the produced fine particles are rapidly cooled. The reaction temperature is also preferably about 600° C. or more. If the reaction temperature is less than this range, the reactivity is low, the addition yield of metal is low, and fine particles are difficult to form. In the present invention, it is preferred that the preheating temperature of starting material gas and the amount of solution or slurry of the metal added are adjusted, the reaction temperature is set to about 600° C. or more, the high-temperature residence time in excess of about 600° C. within the reaction tube is set to about 1 second or less, and the particles after the reaction are rapidly cooled.

For rapidly cooling the particles after the reaction, a method of introducing a large amount of cooling air or gas, such as nitrogen, into the mixture after the reaction or a method of spraying water thereon may be used.

FIG. 1 is a schematic view roughly showing an example of a reaction tube with a coaxial parallel-flow nozzle for use in the production of an ultrafine particulate composite oxide of the present invention. The starting material gas containing titanium tetrachloride is pre-heated to a predetermined temperature by a preheating unit 2 and introduced into the reaction tube 4 through the inner tube of a coaxial parallel-flow nozzle 1. The oxidizing gas is preheated to a predetermined temperature by the preheating unit 6 and introduced into the reaction tube 4 through the outer tube of the coaxial parallel-flow nozzle 1. The salt solution or slurry containing a metallic element is introduced into the reaction mixture of the titanium tetrachloride and the oxidizing gas from the outside of the nozzle through an inlet nozzle 3. The gases and the salt solution or slurry containing a metallic element introduced into the reaction tube are mixed, reacted, rapidly cooled by a cooling gas and thereafter, transferred to a bag filter 5 where the ultrafine particulate complex oxide is collected.

The starting material gas containing titanium tetrachloride as a starting material may be used in the form of a 100 vol % titanium tetrachloride gas but is preferably charged after diluting it with an inert gas to a concentration of about 10 vol % to less than 100 vol %, preferably from about 20 vol % to less than 100 vol %. By using a gas of about 10 vol % or more as a starting material, generation of uniform nuclei increases and the reactivity is enhanced. The inert gas must be selected from those which are not reactive with titanium tetrachloride and not oxidized. Specifically, the diluting gas is preferably nitrogen, argon or the like.

The ultrafine particulate complex oxide obtained by the production process of the present invention is described below. The average primary particle size of the ultrafine particulate complex oxide of the present invention is from about 0.008 to about 0.3 μm, preferably from about 0.015 to about 0.15 μm.

As an index (the measuring method is described later) for sintering resistance of the ultrafine particulate complex oxide, a decrease percentage of BET specific surface area after the heating is evaluated. As a result, the decrease percentage of BET specific surface area of the fine particulate complex oxide containing a -titanium-oxygen-metallic element- bond is about 20% or less after the heating at 700° C. for 1 hour. Determination of the decrease percentage is described below in connection with the Examples.

The ultrafine particulate complex oxide obtained by the production process of the present invention may take a core/shell structure preferably having a metal oxide crystal structure containing a metallic element. For example, in the case of a titanium-metal ultrafine particulate complex oxide containing a mixed crystal state where a titanium-oxygen-metallic element bond is present within the primary particle, a structure such that a $TiO_2$ phase is rich in the core and a metal oxide phase containing a metallic element is rich in the shell is observed.

The ultrafine particulate complex oxide of the present invention can be used for a pigment or a dielectric starting material or as an additive for various compositions and products such as cosmetic, cloth, ultraviolet-shielding agent, abrasive, silicon rubber or paper. The ultrafine particulate complex oxide of the present invention can also be used as a photocatalytic powder material controlled in the photocatalytic effect.

EXAMPLES

The present invention is described in greater detail below by referring to the Examples, however, the present invention is not limited to these examples. Unless indicated otherwise herein, all parts, percents, ratios and the like are by weight.

Evaluation of Sintering Resistance

The decrease percentage of BET specific surface area after heating is employed as an index for evaluating sintering resistance of the ultrafine particulate complex oxide of the present invention.

In an alumina-made crucible, 1 g of a starting powder material was charged and heated at 700° C. for 1 hour in a Siliconit oven. After cooling to room temperature, the BET specific surface area was measured. Assuming that the BET specific surface area of the starting powder material is B1 ($m^2/g$) and the BET specific surface area after the heating is B2 ($m^2/g$), Decrease percentage of BET specific surface area=$\{1-(B2/B1)\} \times 100$ (%)

As the decrease percentage of BET specific surface area is smaller, the sintering resistance is judged higher.

Evaluation of Mixed Crystal State

In the present invention, XPS (X-ray photoelectron spectroscopy) is employed for confirming the mixed crystal state. The details thereon are described in A. Yu. Stakheev et al., *J. Phys. Chem.*, 97(21), 5668–5672 (1993), and the like.

Example 1

11.8 $Nm^3/hr$ (N means Standard State, hereinafter the same) of gaseous titanium tetrachloride in a concentration of 100 vol % and a mixed gas containing 8 $Nm^3/hr$ of oxygen and 20 $Nm^3/hr$ of water vapor were preheated to 1,100° C. and 1,000° C., respectively, and then introduced into a reaction tube using a coaxial parallel-flow nozzle at a flow rate of 53 m/sec and 50 m/sec, respectively. At this time, 3.7 kg/hr of an aqueous 20% zirconium oxychloride solution was sprayed from the outer circumferential part of the coaxial parallel-flow nozzle. In the reaction, a reaction tube as shown in FIG. 1 was used. The inner tube of the coaxial parallel-flow nozzle had a diameter of 20 mm and the starting material gas containing titanium tetrachloride was introduced into the inner tube.

The inside flow rate at a reaction temperature of 900° C. within the reaction tube was 10 m/sec, as calculated. For controlling the high-temperature residence time within the reaction tube to 0.8 seconds or less, cooling air was introduced into the reaction tube after the reaction and then, the produced powder material was collected using a Teflon-made bag filter. Thereafter, a dechlorination treatment was performed by heating the particles in an oven at 500° C. for 1 hour in an air atmosphere.

The thus-obtained titanium oxide had a BET specific surface area of 22 $m^2/g$ and an average primary particle size of 0.08 $\mu m$, and 0.8% of zirconium was detected. By XPS, a titanium-oxygen-zirconium bond was recognized.

The decrease percentage of BET specific surface area (hereinafter referred to as ΔB) after heating at 700° C. for 1 hour was 12%.

Example 2

A starting material gas containing titanium tetrachloride obtained by mixing 10.6 $Nm^3/hr$ of gaseous titanium tetrachloride and 6.0 $Nm^3/hr$ of nitrogen and a mixed gas containing 8 $Nm^3/hr$ of oxygen and 30 $Nm^3/hr$ of water vapor were preheated to 1,100° C. and 1,100° C., respectively, and then introduced into a reaction tube using a coaxial parallel-flow nozzle at a flow rate of 74 m/sec and 66 m/sec, respectively. At this time, 7.1 kg/hr of an aqueous 20% chromium trichloride solution was sprayed from the outer circumferential part of the coaxial parallel-flow nozzle. In the reaction, a reaction tube as shown in FIG. 1 was used. The inner tube of the coaxial parallel-flow nozzle had a diameter of 20 mm and the starting material gas containing titanium tetrachloride was introduced into the inner tube.

The inside flow rate at a reaction temperature of 1,000° C. within the reaction tube was 10 m/sec, as calculated. For controlling the high-temperature residence time within the reaction tube to 0.9 seconds or less, cooling air was introduced into the reaction tube after the reaction and then, the produced powder material was collected using a Teflon-made bag filter. Thereafter, a dechlorination treatment was performed by heating the particles in an oven at 500° C. for 1 hour in an air atmosphere.

The thus-obtained titanium oxide had a BET specific surface area of 34 $m^2/g$ and an average primary particle size of 0.04 $\mu m$, and 1.1% of chromium was detected. By XPS, a titanium-oxygen-chromium bond was recognized. The ΔB was 10%.

Example 3

A starting material gas containing titanium tetrachloride obtained by mixing 10.6 $Nm^3/hr$ of gaseous titanium tetrachloride and 10.0 $Nm^3/hr$ of nitrogen and a mixed gas containing 8 $Nm^3/hr$ of oxygen and 30 $Nm^3/hr$ of water vapor were preheated to 1,050° C. and 1,100° C., respectively, and then introduced into a reaction tube using a coaxial parallel-flow nozzle at a flow rate of 64 m/sec and 36 m/sec, respectively. At this time, 6.5 kg/hr of an aqueous 20% magnesium nitrate solution was sprayed from the outer circumferential part of the coaxial parallel-flow nozzle. In the reaction, a reaction tube as shown in FIG. 1 was used. The inner tube of the coaxial parallel-flow nozzle had a diameter of 24 mm and the starting material gas containing titanium tetrachloride was introduced into the inner tube.

The inside flow rate at a reaction temperature of 1,000° C. within the reaction tube was 10 m/sec, as calculated. For controlling the high-temperature residence time within the reaction tube to 0.9 seconds or less, cooling air was introduced into the reaction tube after the reaction and then, the produced powder material was collected using a Teflon-made bag filter. Thereafter, a dechlorination treatment was performed by heating the particles in an oven at 500° C. for 1 hour in an air atmosphere.

The thus-obtained titanium oxide had a BET specific surface area of 40 $m^2/g$ and an average primary particle size of 0.04 $\mu m$, and 0.5% of magnesium was detected. By XPS, a titanium-oxygen-magnesium bond was recognized. The ΔB was 13%.

Comparative Example 1

11.8 $Nm^3/hr$ of gaseous titanium tetrachloride in a concentration of 100 vol % and a mixed gas containing 8 $Nm^3/hr$ of oxygen and 20 $Nm^3/hr$ of water vapor were preheated to 1,000° C. and 900° C., respectively, and then introduced into a reaction tube using a coaxial parallel-flow nozzle at a flow rate of 49 m/sec and 50 m/sec, respectively. In the reaction, a reaction tube as shown in FIG. 1 was used.

The inner tube of the coaxial parallel-flow nozzle had a diameter of 20 mm and the starting material gas containing titanium tetrachloride was introduced into the inner tube.

The inside flow rate at a reaction temperature of 1,000° C. within the reaction tube was 10 m/sec, as calculated. For controlling the high-temperature residence time within the reaction tube to 0.8 seconds or less, cooling air was introduced into the reaction tube after the reaction and then, the produced powder material was collected using a Teflon-made bag filter. Thereafter, a dechlorination treatment was performed by heating the particles in an oven at 500° C. for 1 hour in an air atmosphere.

The thus-obtained titanium oxide had a BET specific surface area of 20 m$^2$/g and an average primary particle size of 0.08 μm. The ΔB was 35% and this revealed that sintering readily occurred compared with the titanium oxide having similar specific surface area and particle size of Example 1.

Comparative Example 2

A starting material gas containing titanium tetrachloride obtained by mixing 10.6 Nm$^3$/hr of gaseous titanium tetrachloride and 6.0 Nm$^3$/hr of nitrogen and a mixed gas containing 8 Nm$^3$/hr of oxygen and 30 Nm$^3$/hr of water vapor were preheated to 1,000° C. and 800° C., respectively, and then introduced into a reaction tube using a coaxial parallel-flow nozzle at a flow rate of 68 m/sec and 51 m/sec, respectively. In the reaction, a reaction tube as shown in FIG. 1 was used. The inner tube of the coaxial parallel-flow nozzle had a diameter of 20 mm and the starting material gas containing titanium tetrachloride was introduced into the inner tube.

The inside flow rate at a reaction temperature of 1,000° C. within the reaction tube was 10 m/sec, as calculated. For controlling the high-temperature residence time within the reaction tube to 0.9 seconds or less, cooling air was introduced into the reaction tube after the reaction and then, the produced powder material was collected using a Teflon-made bag filter. Thereafter, a dechlorination treatment was performed by heating the particles in an oven at 500° C. for 1 hour in an air atmosphere.

The thus-obtained titanium oxide had a BET specific surface area of 36 m$^2$/g and an average primary particle size of 0.04 μm. The ΔB was 39% and this revealed that sintering readily occurred compared with the titanium oxide having similar specific surface area and particle size of Example 2.

As described in the foregoing pages, according to the present invention, in a vapor phase process of producing titanium oxide by oxidizing titanium tetrachloride with an oxidizing gas at a high temperature, the starting material gas containing titanium tetrachloride and the oxidizing gas are each pre-heated to about 700° C. or more and reacted with a solution or slurry of a salt containing a metallic element, whereby an ultrafine particulate complex oxide containing titanium oxide having excellent sintering resistance and a BET specific surface area of about 5 to about 200 m$^2$/g and containing primary particles in a mixed crystal state are obtained by a one-stage reaction.

The ultrafine particulate complex oxide of the present invention can be suppressed or controlled, for example, in sintering property or photoactivity. Furthermore, a cracking step or the like can be dispensed with or even if required, the load of equipment is very small. Therefore, the production is very easy and simple. Accordingly, the present invention is greatly valuable in industrial practice.

While the invention has been described in detail and with reference to specific embodiments thereof, it will be apparent to one skilled in the art that various changes and modifications can be made therein without departing from the spirit and scope thereof.

What is claimed is:

1. An ultrafine particulate complex oxide containing titanium dioxide, which is an ultrafine particulate complex oxide having a BET specific surface area of about 5 to about 200 m$^2$/g, and has a core/shell structure.

2. An ultrafine particulate complex oxide containing titanium dioxide as claimed in claim 1, which is in a mixed crystal state of allowing a bond of —Ti—O-metal-based element- to be present within a primary particle.

3. An ultrafine particulate complex oxide containing titanium dioxide as claimed in claim 1, wherein the average primary particle size is from about 0.008 to about 0.3 μm.

4. An ultrafine particulate complex oxide containing titanium dioxide as claimed in claim 1, wherein a decrease in the percentage of the BET specific surface area after heating at 700° C. for 1 hour is about 20% or less.

5. A composition comprising at least one ultrafine particulate complex oxide containing titanium dioxide selected from the ultrafine particulate complex oxides containing titanium dioxide as claimed in any one of claims 1 to 4.

6. The ultrafine particulate complex oxide containing titanium dioxide according to any one of claims 1 to 4, wherein a TiO$_2$ phase is rich in the core and a metal oxide phase containing a metallic element is rich in the shell.

7. A pigment comprising the ultrafine particulate complex oxide containing titanium dioxide as claimed in any one of claims 1 to 4.

8. A dielectric starting material comprising the ultrafine particulate complex oxide containing titanium dioxide as claimed in any one of claims 1 to 4.

9. A cosmetic comprising the ultrafine particulate complex oxide containing titanium dioxide as claimed in any one of claims 1 to 4.

10. A cloth comprising the ultrafine particulate complex oxide containing titanium dioxide as claimed in any one of claims 1 to 4.

11. An ultraviolet-shielding agent comprising the ultrafine particulate complex oxide containing titanium dioxide as claimed in any one of claims 1 to 4.

12. An abrasive comprising the ultrafine particulate complex oxide containing titanium dioxide as claimed in any one of claims 1 to 4.

13. A silicon rubber comprising the ultrafine particulate complex oxide containing titanium dioxide as claimed in any one of claims 1 to 4.

14. A paper comprising the ultrafine particulate complex oxide containing titanium dioxide as claimed in any one of claims 1 to 4.

* * * * *